United States Patent [19]

Cerdan-Diaz et al.

[11] Patent Number: 4,822,679

[45] Date of Patent: Apr. 18, 1989

[54] SPRAY-APPLIED CERAMIC FIBER INSULATION

[75] Inventors: Juan M. Cerdan-Diaz, North Tonawanda, N.Y.; Michael J. Sanders, Salsbury, N.C.; Mark E. Wellar, Niagara Falls, N.Y.

[73] Assignee: Stemcor Corporation, Cleveland, Ohio

[21] Appl. No.: 925,580

[22] Filed: Jan. 13, 1987

Related U.S. Application Data

[62] Division of Ser. No. 777,333, Aug. 26, 1985, Pat. No. 4,640,848.

[51] Int. Cl.$^4$ .......................... B32B 9/00; D02G 3/00
[52] U.S. Cl. ...................... 428/392; 428/361; 428/367; 428/375; 428/378; 428/379; 428/388; 428/389; 428/390; 428/391; 501/95
[58] Field of Search .............. 428/392, 375, 378, 379, 428/388, 367, 361, 390; 501/95

[56] References Cited

U.S. PATENT DOCUMENTS

| | | | |
|---|---|---|---|
| 1,718,507 | 6/1929 | Wenzel et al. | 427/196 |
| 2,433,463 | 12/1947 | Lampe | 427/196 |
| 2,604,416 | 7/1952 | Dolbey | 427/196 |
| 2,842,897 | 7/1958 | Finn | 47/9 |
| 2,850,421 | 9/1958 | Thompson | 156/209 |
| 2,929,436 | 3/1960 | Hampshire | 156/209 |
| 3,107,057 | 10/1963 | Hanusch | 239/336 |
| 3,171,874 | 3/1965 | Rolle | 264/267 |
| 4,174,331 | 11/1979 | Myles | 106/38.5 R |
| 4,272,935 | 6/1981 | Lukas et al. | 264/121 |
| 4,547,403 | 10/1985 | Smith | 427/196 |

FOREIGN PATENT DOCUMENTS 2093015 8/1982 United Kingdom .

*Primary Examiner*—Sharon A. Gibson
*Attorney, Agent, or Firm*—George W. Moxon, II; Joseph G. Curatolo; Larry W. Evans

[57] ABSTRACT

A thermal insulation is formed by simultaneously spraying ceramic fibers and a binder at a surface to be covered. An aqueous binder is prepared prior to application to the fiber during the spraying operation. The binder includes an organic component which provides necessary wet and green adhesion to the substrate surface and wet and green cohesion to the newly formed lining prior to firing of the sprayed-on layer. The binder also includes an inorganic component which functions at and after exposure to a high temperature to secure the ceramic fibers to the substrate and to one another. Drying and firing of the layer develops strength in the inorganic binder. Known ceramic fibers such as alumina-silica amorphous fibers, alumina-silica-zirconia fibers, polycrystalline mullite fibers, alumina fibers, mineral fibers, or combinations thereof, and the like may be employed. The fiber may be precoated with the organic binder. Preparation of the binder, coating of the fibers with an organic binder component and spray formation of the ceramic fiber insulation are described.

5 Claims, 2 Drawing Sheets

SPRAY-APPLIED CERAMIC FIBER INSULATION

This is a division of co-pending application Ser. No. 777,333 filed Aug. 26, 1985, now U.S. Pat. No. 4,640,848.

The present invention relates to mixtures of ceramic fibers and an organic-inorganic binder system. More particularly, the present invention relates to a sprayable ceramic fiber, thermally-insulating layer, precoated fibers therefor and their formation and binder systems suitable for use in spray application of ceramic fibers to form a thermally insulating layer.

BACKGROUND OF THE INVENTION

Insulating fiber linings sprayed-over refractories have been described at pages 42–44 of "Industrial Heating," November, 1984 issue. This reference discloses a sprayed-on thermally insulating fiber lining composed of a mixture of alumina-silica fibers and an inorganic binder of composition not disclosed in this article. A later publication by the same company (Manville Service Company) indicates the composition of a suitable binder to be acid aluminum phosphate.

A commercially available ceramic fiber binder is sold under the name "Strataseal TM" by Strataseal Corporation, McMurray, Pa.. While the specific composition of this binder has not been revealed, this material is known to be toxic and highly acidic. When used, precautions must be taken to avoid inhalation of its fumes or fibers coated therewith or contact of it or coated fibers while wet with the skin. A further disadvantage of this system is revealed subsequent to its application to a steel furnace substrate. With passage of time, corrosion of the metal substrate has been observed, which corrosion is believed due to the acidic character of the this binder system which is believed to contain, inter alia, phosphoric acid.

A further problem with known spray-on ceramic fiber insulation systems is a lower level of wet adhesion and wet cohesion than is desired and/or necessary in many situations. The term "adhesion" as used herein is in reference to adherence of the ceramic fibers of a lining to a substrate such as a furnace surface. The term "cohesion" as used herein is in reference to coherence of the ceramic fibers of a lining to one another. The terms "wet adhesion" and "wet cohesion" as used herein are in reference to adherence and coherence respectively of the ceramic fibers while the vehicle of the binder system is present on the fibers. As the lining thickness builds up, its weight does also. When applied to ceiling surfaces, the weight of the newly installed wet lining commonly causes separation of the newly applied lining from its substrate. While this problem can be ameliorated by mechanical devices which are affixed to the substrate prior to application of the sprayable lining, such practice is not preferred due to additional materials and costs and reduction in thermal insulation efficiency. Such mechanical supports means may include the installation of metal mesh in spaced relationship to ceiling or overhead surfaces, or stud anchors which are affixed to the substrate and protrude in the direction of the lining thickness away from the surface of the substrate.

It is thus a primary object of the present invention to reduce or eliminate toxicity hazard associated with prior sprayed-on ceramic fiber insulation systems. It is also an object of the present invention to improve the wet adhesion and wet cohesion of the newly sprayed-on layer so that greater thicknesses of lining may be applied to an overhead surface with minimum need of mechanical support means. It is also an object of an embodiment of the invention to provide an inorganic-organic binder which facilitates handling and spraying of the ceramic fiber and binder.

SUMMARY OF THE INVENTION

According to the present invention, there is provided a thermally insulating layer comprising from about 72.5 to about 97.5 weight percent of ceramic fibers, sufficient organic binder component to impart a minimum of about 0.2 g/cm$^2$ (0.41 lb/ft$^2$) adherence while wet to the intended substrate, and from about 2.5 to about 30 weight percent of an inorganic binder component derived from colloidal high temperature resistant refractory oxides.

The necessary adherence to the substrate depends upon density and thickness of the layer. The amount of adhesion and cohesion must be sufficient to offset the combined weight of the ceramic fiber, binder and binder vehicle. For example, only about 0.2 g/cm$^2$ is the necessary adhesion for a 4 lb/ft$^3$ (dried density) and 1 inch thick lining whereas about 3.0 g/cm$^2$ is necessary for a 10 lb/ft$^3$ (dried density) and 6 inch thick layer which may have a wet weight of about 20 lb/ft$^3$. The necessary wet adhesion and wet cohesion is obtained by an organic polymer component of the binder. From about 0.05 to about 2.0 weight percent based on ceramic fiber weight when utilizing standard or lubricated fiber, and to about 5 weight percent when precoated fiber is utilized, of a water-soluble organic polymer containing polar groups, preferably selected from the group including acrylamides, hydroxyethylcelluloses, carboxymethylcelluloses and carboxyethylcelluloses, has been found to be effective in imparting the necessary wet adhesion and wet cohesion. Increasing the amount of organic binder component increases the amount of wet adhesion and wet cohesion.

According to another aspect of the present invention, there is provided a method of forming a thermally-insulating layer on a substrate comprising providing precoated ceramic fibers having a coating thereon of organic binder component sufficient to impart a minimum of about 0.2 g/cm$^2$ adherence to steel or the chosen substrate of interest; providing a binder including an aqueous solution/dispersion having from about 1.5 to about 40 weight percent of colloidal high temperature resistant oxides; applying said binder to said precoated ceramic fibers while spraying said fibers to impact toward the substrate. The binder may also include organic binder component in solution.

According to a further aspect of the present invention, there is provided a method of forming a thermally insulating layer on a substrate comprising providing ceramic fibers; providing aqueous binder comprising sufficient organic binder component to impart a minimum of about 0.2 g/cm$^2$ adherence to steel or the chosen substrate of interest, and from about 2.5 to about 30 weight percent of colloidal high temperature resistant refractory oxides; applying said binder in amount of from about 75 to about 180 weight percent based on fiber weight to the ceramic fibers while spraying the fibers toward the substrate.

DETAILED DESCRIPTION OF THE INVENTION

As used herein, the terms "having," "including," "comprising" and "containing" are synonymous. Unless otherwise specified at the point of use, all percentages, fractions and ratios given in this specification and the appended claims are on a weight basis. "Green," when used in combination with or in reference to a physical property, e.g., adhesion, cohesion or strength, refers to that physical property of the sprayed-on ceramic fiber lining or its components when dried to remove the solvent/vehicle of the binder but not yet fired at or above the decomposition temperature of the organic binder component. "Rebound," as used herein, refers to sprayed material which does not adhere to the surface at which the sprayed material is directed but rather rebounds or bounces away. Rebound is an undesired phenomenon.

MATERIALS

The first component of the refractory sprayable, thermally insulating composition of this invention is ceramic fiber, which is present in amount of from about 72.5 to about 97.5 percent by weight. The ceramic fiber is preferably selected from the group consisting of fibers of alumina-silica, alumina-silica-zirconia, polycrystalline mullite fibers, calcium-alumino-silicate, alumina, mineral fibers and the like. The particular fiber is chosen dependent upon the temperature and atmospheric conditions anticipated in service in a manner well known to those skilled in the art of high temperature thermal insulation using ceramic fibers.

Of the above-given classes of fibers, those of alumina-silica and alumina-silica-zirconia, such as those sold by Sohio Engineered Materials Company (SEM) of Niagara Falls, N.Y., under the trademark Fiberfrax ® ceramic fibers are preferred for installations where the continuous use temperature will not exceed 1427° C. (2600° F.). When higher service temperatures are contemplated, Fiberfrax ® alumino-silicate ceramic fibers may be admixed with Fibermax ™ polycrystalline mullite fibers which are available from Sohio Engineered Materials Company of Niagara Falls, N.Y.. When polycrystalline mullite fibers alone are employed, continuous service temperatures may be as high as 1649° C. (3000° F.).

The manufacture of alumino-silicate refractory fibers is described in U.S. Pat. No. 2,557,834. The manufacture of alumina-silica-zirconia refractory fibers is described in U.S. Pat. No. 2,873,197. The manufacture of polycrystalline oxide fibers of, for example, alumino-silicate, is described in U.S. Pat. No. 4,159,205 and 4,277,269. A particularly preferred ceramic fiber for use in the present invention is Fiberfrax ® bulk fiber which is an alumino-silicate ceramic fiber having a continuous service temperature upper limit of about 1260° C. (2300° F.), and a mean fiber diameter of 2–3 microns.

The method of manufacture of the ceramic fibers is not critical. Fibers produced by blowing, spinning, sol-gel and other methods may be used in formation of spray-applied layers according to the present invention.

The ceramic fibers may be refined to remove the shot which naturally occurs during formation of such ceramic fibers by blowing or spinning of a molten stream of ceramic material with a high velocity stream of air or rapidly rotating wheels respectively, but removal of the shot is not necessary prior to usage of fibers in the present invention. Use of shot-free fiber results in sprayed-on layer of lower density. Use of shot-free fiber results in sprayed-on layer of greater thermal insulation value than one of shot-containing fiber at equal layer density.

Length of the ceramic fibers is not critical. Fibers of a length which cannot be readily handled by the particular fiber spraying apparatus employed may be chopped into reduced lengths to facilitate their delivery from the spraying apparatus. Generally, use of fibers of greater length results in sprayed-on linings of lower density and vice versa.

Diameter of the ceramic fibers is believed to not be critical. Typically, commercially available ceramic fibers sold for use as thermal insulation range in diameter from about 2 to about 5 microns. All are deemed suitable for use in the present invention. Larger diameter fibers result in a spray-applied layer exhibiting less thermally induced shrinkage.

In a particularly preferred embodiment of the present invention, the ceramic fibers are lubricated at the time of their manufacture to facilitate their separation and conveyance into and through the spraying apparatus. Equipment presently available is capable of handling fiber lengths up to about 2 inches. Greater lengths result in clogging of the spraying apparatus.

When bulk alumino-silicate fibers are employed, a particularly preferred lubricant is 50 HB-100 polyalkylene oxide available from Union Carbide Corporation, applied at from about 0.25 percent to a maximum level of about 1.0 percent and preferably about 0.5 percent based on weight of the fiber. This material is a 50 percent ethylene-oxide, 50 percent propylene-oxide.

In preferred embodiments of the invention, the fiber at the time of its manufacture is coated with an organic polymer binder component to be described in detail herein below. This polymer serves to impart wet adhesion and wet cohesion to the sprayed-on ceramic fibers during formation of a sprayed-on layer. It serves as a binder and tackifier to the wet layer. This polymer continues to serve as a binder upon drying of the sprayed-on layer until the polymer's maximum temperature is exceeded, upon which it decomposes and the ceramic fibers are thereafter bound to one another by an inorganic binder. Fiber-to-fiber ceramic bonding through sintering also occurs if temperatures and exposure time are sufficient.

A second component of the refractory insulating sprayable composition of this invention is a binder system. The binder system includes two components: an organic component and an inorganic component. The organic component functions at temperatures below its decomposition temperature as a tackifier and adhesion-enhancing agent to adhere the newly spray-applied wet fibers to one another and to the substrate, whether of metal or refractory material. The organic component reduces the amount of rebound. When the substrate is porous and absorbent, migration of the binder to the substrate occurs which contributes to failure of the insulating layer through loss of adhesion/cohesion. Migration of the binder to the hot face of the sprayed-on layer can also occur when a new spray-applied layer is dried resulting in a hard crusty layer of ceramic fibers at the hot face. The oganic component reduces inorganic binder migration along and from the ceramic fibers. The "hot face" is that which is presented to the hot interior of a furnace kiln, oven, etc. The use of an organic component enables laying up in a single spray application a layer of greater thickness on overhead surfaces than is possible without usage of such a binder component when all other aspects are held constant and thus reduces need for mechanical supports. The inorganic binder component serves to bond the fibers to one another and to their substrate at temperatures above the decomposition temperature of the organic component. The inorganic component to a small extent also contributes to wet adhesion and wet cohesion of the ceramic fibers.

Suitable as the organic binder component is an organic polymer substance containing polar groups known to impart tackiness or adhesive properties to the polymer. Particularly suitable polar groups are amide, ether, hydroxyl, carboxyl, urethane and amine groups. Preferred are those selected from the group consisting of acrylamides, hydroxyethylcelluloses, carboxymethylcelluloses and carboxyethylcelluloses. Mixtures of suitable organic materials also may be used. The organic component may be anionic, non-ionic or cationic; the choice being made with reference to the inorganic component to assure compatability and avoid precipitation prior to application of the binder to the fiber. Generally, non-ionic organic component may be used with any of the recommended inorganic binder components; anionic organic binder component should be used with anionic inorganic component; and cationic organic binder component should be used with cationic inorganic binder component.

The organic polymeric binder component is applied to the ceramic fibers in amount sufficient to impart a minimum of $0.2$ g/cm$^2$ wet adhesion to the substrate. An amount of from about 0.05 to about 5.0 weight percent and preferably about 0.5 weight percent is applied based on weight of the fiber.

Of the aforementioned organic binder components is preferred an anionic water-soluble/dispersable acrylamide-based polymer available under the trademark Reten® 525 from Hercules, Inc. This acrylic polymer provides excellent adhesion of the coated fibers, when wetted, to each other and to the surface of the substrate toward which they are sprayed. Other suitable organic binders include a hydroxyethylcellulose (non-ionic polymer) available under the trademark Natrasol® 250 HHR from Hercules, Inc., Methocel® A4M methylcellulose (non-ionic) water soluble from Dow Chemical Company, acrylamide based copolymer water soluble (low cationic activity) Reten® 210 from Hercules, Inc., acrylamide-based copolymer water soluble (moderate cationic activity) Reten® 220 from Hercules, Inc., acrylamide-based polymer water soluble (non-ionic) Reten® 420 from Hercules, Inc., and water soluble acrylic polymer Carbopol® from B. F. Goodrich Chemical Company, and the like.

Figure 2:
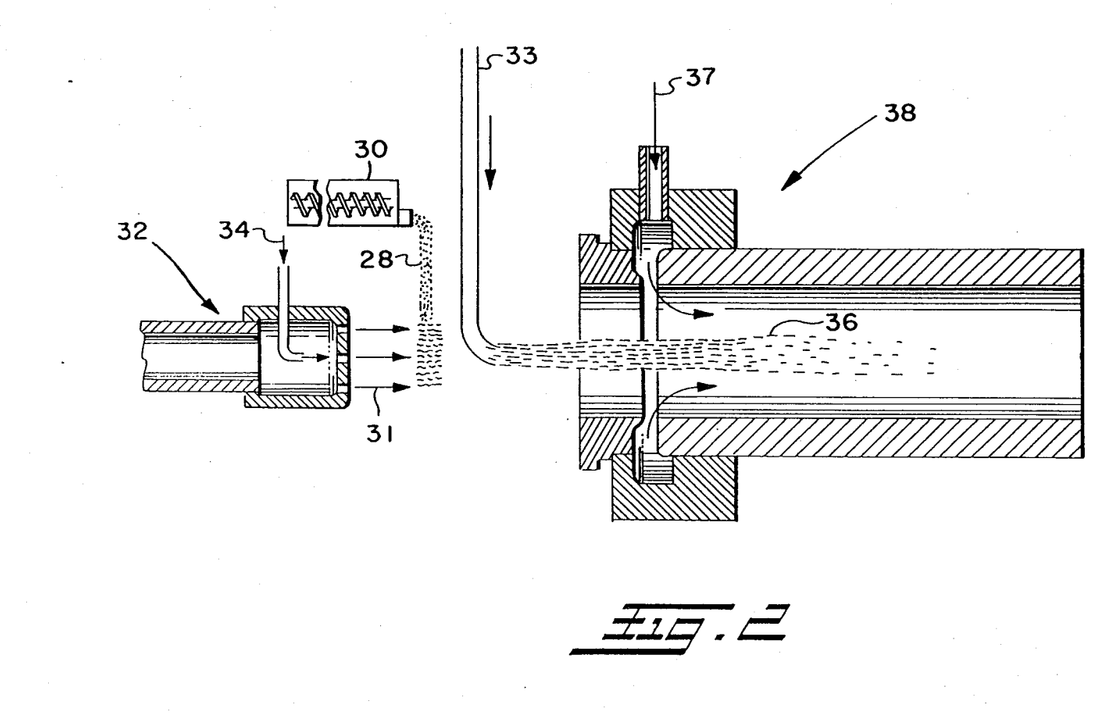
FIG. 2 is a schematic illustration of a process and apparatus used in forming precoated ceramic fiber in accordance with the invention.

As previously stated, it is preferable that the organic binder component be applied to the fiber during manufacture of the fiber. This may be done by dissolving or dispersing a finely divided powder of the organic binder in water and introducing it into the gas stream which is utilized to convert the molten stream of ceramic material into fibers. As shown in FIG. 2, the organic binder component is preferably applied by feeding the finely divided powder 28 via a twin auger feeder 30 mounted above the primary high velocity air stream 31 from primary air nozzle 32. Primary air stream 31 containing lubricant solution 34 impacts the stream 33 containing the molten ceramic material stream 33 to be fiberized. The lubricant solution is introduced into the primary air stream which impacts the molten ceramic material. The lubricant solution sufficiently wets the dry powdered organic binder component to cause its particles to become sufficiently tacky so the organic binder component adheres to the newly formed fibers 36. If no lubricant is being applied, the organic binder is fed into water alone. Although the molten stream 33 that is fiberized is at a temperature of about 1982° C. (3600° F.) when alumino silicate fibers are being formed from kaolin, it has been found that little or no degradation of the organic binder occurs due to the rapid cooling of the molten stream 33 as it is fiberized. Application of the organic binder component to the fibers 36 during their formation permits usage of higher levels of organic binder component and hence results in higher levels of wet adhesion, wet strength and green strength of the newly formed sprayed-on ceramic fiber insulation layer on a substrate. The organic binder can also be added as a solution/dispersion with lubricant via secondary air stream 37 which is introduced through secondary air nozzle 38 to extend in length and attenuate in diameter the ceramic fibers 36 as they are being formed. Application of the organic binder component can also be done during the ceramic fiber spinning process by introducing the organic component with the lubricant system. The precoated ceramic fiber is dry to the touch and is not tacky until wetted with a solvent for its coating of organic binder component. When the organic binder component is applied during ceramic fiber manufacture, the actual amount imparted to the ceramic fiber may be somewhat less than is determined by calculation based on ceramic fiber material and organic binder feed rates.

While not preferred, it is also possible to apply the organic binder to the ceramic fiber subsequent to its manufacture. This may be accomplished by dissolving the organic binder component in water, either separately or in combination with the inorganic binder component. It is preferred to form a pre-mix of concentrated organic binder component which is thereafter combined with the inorganic binder component to obtain the desired overall concentration of the organic and inorganic components. In this latter embodiment, the amount of organic binder which can be conveniently introduced into the liquid is less than that which can be applied to the fiber at the time of fiberization; therefore, higher wet adhesion and wet cohesion of the ceramic fibers can be obtained with a precoated fiber. This is due to the fact that at desired concentrations of suitable organic binder components, their water solutions are very viscous and gelatinous. For example, only about 0.1 weight percent of Reten® 525 in ordinary tap water results in a viscous and gelatinous solution. These aqueous solutions of organic binder components are difficult to pump to the spray apparatus and to atomize into a spray for effective coating of the ceramic fibers as they are simultaneously delivered from the spraying apparatus and directed at the substrate to be insulated.

The inorganic binder component functions to secure the ceramic fibers to one another and to the substrate when dry (green adhesion and green cohesion) and when in service at temperatures above the decomposition temperature of the organic binder component. The inorganic component also imparts wet adhesion to a small extent. A necessary ingredient of the binder system for the present invention is from about 2.5 to 30 weight percent solids (dry weight basis) derived from finely divided (colloidal) sol of an inorganic high temperature refractory material. A "sol" is a stable dispersion of discrete colloid size particles in aqueous media. Sols have extremely small particle size and large surface areas. Suitable sols include those of silica, alumina, zirconia and the like, and mixtures of these. Of these, silica is preferred for most applications unless specific resistance to chemical attack or higher service temperature indicates a need for a different material.

Colloidal silica sols may be acidic or basic in nature. Preferred between these types is the basic-type material because the corrosion induced in a metal substrate, for example, a steel lining of a furnace, is minimal when contrasted with that following use of acid-type binder. An amorphous colloidal silica having extremely small particle size, e.g. on the order of 12 to 15 millimicrons and large surface area, is desired. One of the colloidal silicas preferred for use in compositions of this invention is Ludox® HS-40 colloidal silica, a basic-type product of E. I. Du Pont de Nemours Compay, which has a pH of about 9.7. This product is an aqueous dispersion of 40 percent amorphous silica, the silica particles having an average size of 13-14 millimicrons, the suspension having a density of 10.8 pounds per gallon corresponding to a specific gravity of 1.28. Another suitable colloidal silica sol is Nalco® 1034-A, an acid-type product of Nalco Chemical Company, which has a pH of about 3.2.

Other suitable inorganic binder components include colloidal alumina, i.e., Nalco® ISJ-614 from Nalco Chemical Company, Oakbrook, Ill. and colloidal zirconia, i.e., zirconia sol-acetate stabilized from Remet Corporation, Chadwicks, N.Y.

The inorganic binder component is prepared for use in the present invention by diluting the colloidal sol with water to form an aqueous dispersion having from about 1.5 to about 40 percent (dry weight basis) colloidal solids and preferably from about 5 to about 15 percent colloidal solids and, more desirably, about 10 percent solids. The amount of inorganic binder solids desirably imparted to the spray-applied ceramic fiber based on weight of the fiber is from 2.5 to 30 weight percent. Ordinary tap water may be used as a diluent vehicle. When too little inorganic binder component is employed, the shrinkage of the sprayed ceramic fiber lining will be larger than when greater amounts are employed. Also less than maximum wet adhesion and cohesion occur. As the amount of inorganic binder component is increased beyond the recommended range, the resultant ceramic fiber sprayed-on insulation tends to become too crusty and friable to meet industry performance requirements or expectations. Higher concentrations of inorganic binder component within the previously specified range are recommended when the furnace burner exhaust velocity is high to reduce or eliminate erosion of the sprayed-on ceramic fiber insulation, or when mechanical shock is present as in a removable insulated cover.

While not preferred due to convenience, environmental, worker safety and cost considerations, it is possible to utilize other liquid vehicles to aid in solution/-dispersion of carriers for the organic and inorganic binder components. The liquid vehicle should be chosen so that it is a non-solvent for the ceramic fiber while a solvent for the organic binder component. The liquid vehicle does not have to fully dissolve the organic binder component; rather, it is sufficient if the organic component be tacky when wetted with the liquid vehicle. Water is highly preferred as a liquid vehicle but other liquid vehicles can also be used such as methanol, ethanol, ethylene glycol, diethylene glycol and mixtures thereof, including mixtures with water. Such mixtures can be used to enable utilization as organic binder components materials which would otherwise be unacceptable due to their low solubility in water alone and therefore low resultant wet adhesion and wet cohesion values when employed with water alone. Stable emulsions and dispersions of organic binder component are also within contemplation of the present invention.

LABORATORY BINDER ADHESION TESTING

Figure 1:
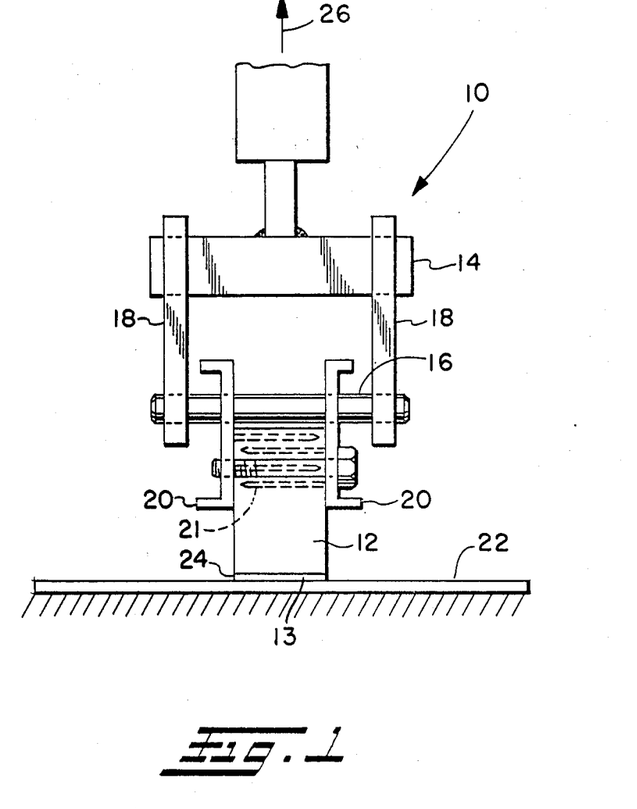
FIG. 1 illustrates an apparatus for determining the adherence value of binder compositions in accordance with the invention.

In order to effectively and economically screen potentially suitable binder compositions for use in the present invention, a laboratory test was designed to measure wet adhesion of ceramic fibers coated with binder. The apparatus used to determine adhesion is illustrated in FIG. 1 of the drawing. The apparatus illustrated is used in conjunction with a conventional movable crosshead tester (not illustrated), such as one available from Instron Corporation. Adhesion is determined by measuring the force required to separate the end of sample 12 of ceramic fiber blanket of known cross-sectional area from anchored substrate plate 22.

The lower end 13 of sample 12 is wetted with the binder candidate to be evaluated and thereafter contacted to the substrate plate 22. The force measured is transmitted through sample 12 and binder 24 to plate 22. Binder is applied by quickly dipping into and quickly removing the lower end 13 of the sample 12 from a vessel containing binder solution/dispersion. After wetting with binder 24, the lower end 13 of sample 12 is perpendicularly contacted to plate 22 and allowed to remain in contact therewith for 30 seconds to allow the binder to set before applying a vertical force 26 to separate sample 12 from plate 22.

Dimensions of sample 12 and apparatus 10 are not critical. Jaw members 20 include needles 21 secured thereto which penetrate sample 12 and assist in retaining sample 12, particularly when positioning a sample into apparatus 10. Upper horizontal bar 14 is adapted to be connected to the moving crossbar of the testing machine. Lower crossbar 16 is joined to upper crossbar 14 by slidable links 18. Jaw members 20 are slidably retained by lower bar 16. For convenience, jaw members 20 are of a length greater than the width of sample 12 and one jaw member is provided with a threaded aperture at each end while the other jaw member is provided with an aperture at each end which can be aligned with its corresponding threaded aperture. When machined appropriately, ordinary capscrews are employed to force jaw members 20 toward each other and thereby compressibly engage and retain sample 12.

To obtain the adhesion values reported herein, samples of Sohio Engineered Materials Company blanket (Durablanket TM) having a nominal density of 4 pounds per cubic foot (pcf), a normal thickness of 1 inch (2.5 cm) were used. Blanket samples of 6 inch (15 cm) width by 3 inch (7.5 cm) vertical length by 1 inch (2.5 cm) were prepared. Anchor plate 22 was formed of metal, e.g., steel or aluminum and was thoroughly cleaned prior to each test. Aluminum is preferred for plate 22 because it does not rust. All other parts of apparatus 10 are preferably formed of steel.

SPRAY APPLICATION EQUIPMENT

Spraying apparatus suitable for use in practice of the present invention is available for Unisul Inc. of Winterhaven, Fla., under the name "Poly-Spray A-300 Fiber Spray Machine." Model A-300-5-47 was utilized in the examples discussed hereinbelow. Other fiber spraying machines may also be used. Unisul Inc.'s Unifan TM nozzle is recommended. This nozzle has a plurality of binder delivery spray nozzles equidistantly arranged about the periphery of its race track-shaped delivery end. The central portion of the race track is the port through which the dry ceramic fiber is delivered. In accordance with a preferred embodiment of the present invention, the middle binder liquid nozzle on each long stretch of the race track is replaced or repositioned such that its liquid spray pattern is directed to form two flat fan patterns which converge approximately 2.5 cm (1 inch) beyond the delivery face of the nozzle. The Unifan TM nozzle, as normally supplied, delivers the liquid binder solution from nozzles which are arranged to throw a spray pattern whose fan shapes are generally perpendicular to the exit face of the nozzle.

INSTALLATION OF SPRAYED-ON CERAMIC FIBER LINING

The surface of the substrate to which ceramic fiber layer is to be spray-applied is prepared to receive the layer. Preferred preparation varies according to the type of substrate to which the spray-applied layer is to be applied.

When the substrate is a metal surface, e.g. steel, the surface should be free of all oily substances and rust. Blast cleaning is a highly effective method. Surface temperature should be at least 10° C. (50° F.) at the time of spray application. Mechanical supports, when used, should be securely attached at sufficient intervals such that they do not restrict or prevent the sprayed ceramic fiber from impacting directly on the substrate. For example, ½ inch opening mesh expanded metal, when positioned parallel to the substrate surface, is not a desirable support material because it does not allow complete penetration of the fiber.

When installing a spray-applied layer according to the present invention, corners and joint areas should be sprayed first. Where mechanical supports are used, the areas behind these supports should be sprayed first to assure proper and complete packing of the fiber around the supports. This technique also maximizes transfer of load from the sprayed-on layer to the supports. The layer should be built up gradually to the desired thickness. Multiple passes should be used for each given area to be insulated. Approximately one to 2 inches (2.5 to 5.0 cm) should be applied in a single pass, even though much greater amounts can be applied. Application of too much material in a single pass may result in separation of the wet layer from the substrate, especially on ceiling or overhead horizontal surfaces. Overhead downwardly facing or horizontal surfaces should be sprayed first and thereafter vertical surfaces such as walls. The Unifan TM nozzle should be held about two to three feet (two thirds to one meter) from the surface being covered. Delivery should be perpendicular to the surface to be covered whenever possible to minimize rebound.

When the substrate is a non-metallic refractory material, its surface should be clean and free of all carbon, oxide and glassy deposits. All loose deposits should be removed. Blast cleaning is a highly effective method; wire brushing is also effective. Mechanical supports are recommended on overhead non-vertical surfaces including arches, inclined and horizontal surfaces. The temperature of the surface should be at least 10° C. (50° F.). Many refractory surfaces are porous, e.g. dense brick; these surfaces should be presprayed with the binder and sufficient time allowed for the binder vehicle to be absorbed before spraying of the fiber begins. When ceramic fiber is to be sprayed over low density brick which is very porous, e.g., IFB (insulating fire brick), the brick should be presprayed with the binder sol immediately before beginning application of the fiber. When the substrate is low density brick, the prespray should not be allowed to dry before application of the fiber begins. The fiber spray procedure is as given above for metal. If the ceiling is of the sprung arch type, the section at the highest portion of the arch should be the first part sprayed with fiber.

Where even greater wet adhesion and wet cohesion appear to be needed, e.g., high absorbent porous brick, precoated ceramic fiber and liquid binder containing inorganic and organic components may be used together.

After spray installation, when possible, the lining should be fired to 427° C. (800° F.) for about 8 hours to cause slow removal of the binder vehicle, curing of the organic component and removal of the organic component, and then fired to the maximum normal operating temperature. When fired to about 982°–1038° C. (1800°–1900° F.) for about 24 hours, ceramic bonding of the fibers occurs.

A furnace, kiln, or a unit or surface requiring thermal insulation, may be insulated according to the present invention, as shown in the following examples.

EXAMPLE 1—Prior Art Binder System

A refractory brick-lined car bottom annealing furnace was sand-blasted prior to application of sprayed-on ceramic fiber insulation. This surface was irregular due to spalled brick. Bulk lubricated alumino-silicate fiber (Sohio Engineered Materials Co. Fiberfrax® 6000L) was utilized. The binder was prepared by combining approximately two gallons of concentrated Strataseal TM binder with water to form about 55 gallons of solution. The Unisul TM spray equipment was adjusted to deliver ceramic fiber at a rate between 8 and 10 pounds per minute and binder at a rate between 11 and 17 pounds per minute. An initial application of a very thin layer of wet fiber appeared to promote adhesion between the sprayed-on ceramic fiber layer and the refractory brick. The furnace lining was built up to roughly 3 inch (7.5 cm) thickness in the arch for about two-thirds of its length. At this point, the entire spray-applied layer on the arch fell. The fiber was knitted together but did not have much adherence to the ceiling or from fiber-to-fiber. The spray gun was held at right angles to the surface to promote good bonding. On examination of the newly applied lining it was apparent that the fiber had penetrated approximately ¼ inch (6 mm) between the courses of the brick.

Prior to spraying, two different anchoring systems were installed in portions of the arch to mechanically assist retention of the sprayed-on ceramic fiber lining. The fumes of this binder were very objectionable. To protect themselves, workmen installing the lining should wear a full suit of protective clothing and a toxic fume-removing respirator system.

The first anchoring system tested included 28 inch (0.7 m) width expanded metal mesh having a diamond pattern of approximately ½ inch (12 mm) opening. The sprayed ceramic fiber/binder mixture did not adequately penetrate this mesh; rather, the mixture layed upon the surface of the metal mesh. After building the sprayed lining to a thickness of about 3 inches for about two thirds of the length of the arch the entire spray-applied layer of the arch fell. The fiber was knitted together but did not have much adherence fiber-to-fiber.

The second anchoring system tested included metal mesh having approximately ¾ inch-square (18 mm-square) openings. A second spray attempt of the arch section including this second anchoring system had almost been finished when the whole arch lining fell again. The sprayed ceramic fiber/binder penetrated these openings and filled the space between the mesh and the refractory brick to which the mesh had been fastened with powder-actuated fasteners.

A third spray attempt resulted in a lining about 2 inches (5 cm) thick which remained on the arch. It was concluded that about 2 inches (5 cm) thickness was the maximum attainable if fall-in was to be avoided.

Following successful spray installation of the lining, the furnace was fired to 427° C. (800° F.) and thereafter cooled overnight. The lining remained in place and developed a very hard crusty surface. This crusty surface is believed due to migration of the binder to the hot face surface of the furnace upon drying. Good adhesion appeared to exist between the refractory wall surface and the fiber.

This installation was examined after approximately six weeks' use, during which it was cycled to a maximum of 927° C. (1700° F.). The arch of the furnace had lost its sprayed-on ceramic fiber veneer which had overlain the expanded metal mesh. The fiber was highly friable throughout the entire thickness of the fallen sprayed layer. The condition of the fiber resembled that of 1260° C. (2300° F.) rated alumino-silicate fiber prepared from kaolin clay that had been severely overfired. This degradation of the ceramic fiber is believed to be caused by the chemical nature of the binder.

EXAMPLE 2

A small laboratory test furnace having a single natural gas burner in its back wall and a flat steel lining defining its interior ceiling and walls and a surface area of 180 sq ft was spray lined. A 6 inch (15 cm) thick lining was desired. Fiberfrax® 6000L bulk alumino-silicate fiber which had been lubricated during its manufacture by the application of about 4 percent by weight of an aqueous solution containing 50 HB-100 polyalkylene oxide was used. A binder system was prepared using tap water into which were introduced Natrasol® 250 HHR hydroxyethyl cellulose and Ludox® HS-40 colloidal silica in sufficient amount to result in respective binder solution concentrations of 0.3 and 10 weight percent. The ceiling included Y-shaped anchors placed on 12 inch (30 cm) centers; no anchors were utilized in the walls.

Three attempts were made before a satisfactory lining was achieved.

Attempt Number one: binder solution delivery rate 18 lb/min, fiber delivery rate 11 lb/min, Y-shaped anchors placed on 1 foot centers. Result was that ceiling fell-in when 6 inch (15 cm) thickness was reached.

Attempt Number two: Binder solution delivery rate 18 lb/min, fiber delivery rate 11 lb/min, anchors bent so that arms were parallel to and spaced about 1.5 inches (3.7 cm) from the ceiling. Result was that ceiling fell in when 6 inch (15 cm) thickness was reached.

Attempt number three: Binder solution delivery rate 12 lb/min, Fiber delivery rate 11 lb/min, anchors as in attempt two. Result was a lining of 6 inches (15 cm) thick which remained on the ceiling and walls.

Following installation of this spray-applied lining, the furnace was fired to 1093° C. (2000° F.) for 24 hours and thereafter cooled and the shrinkage measured. Linear shrinkage was found to be approximately 1 percent. Thereafter the furnace was again fired to 1093° C. (2000° F.) for 24 hours and cooled. The calculated shrinkage, based on initial and final measurements, was approximately 1.5 percent in the side walls and 1.75 percent in the back wall. After firing a third time to 2000° F. for 24 hours, shrinkage was determined to be approximately 2 percent based on initial measurements. Thereafter the furnace was fired to 1177° C. (2150° F.) for 24 hours and thereafter to 1260° C. (2300° F.) for 24 hours. The cumulative shrinkage at the conclusion of these cycles was about 2.7 percent in the side walls and 2.6 percent in the back wall. The lining remained in place with only a few small surface cracks which did not penetrate to the metal interior of the furnace shell. After the firing cycles and measurements, the furnace was cleaned. The interior metal surfaces did not show any evidence of corrosion attack by the binder system. The ceramic fiber did not show any evidence of degradation. Good adhesion of ceramic fiber to the steel was observed.

EXAMPLE 3

The furnace of Example 2 was cleaned and relined with spray-applied ceramic fiber insulation. Cleaning was accomplished by cutting the lining into blocks, pulling out these blocks and thereafter spraying water on the shell and brushing with a broom to remove any remaining fiber. After cleaning, the furnace walls and ceiling were slightly oxidized ($Fe_2O_3$). An aqueous binder solution was made containing on a dry weight basis as its organic binder 0.075 percent Reten® 525 and as its inorganic binder 10 percent silica from Ludox® HS 40. The ceiling, north wall and back wall of the furnace were sprayed using a Unisul™ spray apparatus. The fiber employed was SEM Fiberfrax® 6000-L. The ceiling of this furnace was sprayed to form an approximately 2 to 3 inch (5 to 7.5 cm) thick base layer over the entire ceiling; thereafter, the ceiling was gradually built up to a 6 inch (15 cm) thickness, doing approximately 3 to 4 feet (1 to 1.3 m) sections at one time with the Unisul™ spray gun being held generally perpendicular to the surface. A Unisul™ Unifan™ nozzle was employed which included provision for 8 binder delivery nozzles evenly arranged around the circumference of its race track-shaped fiber delivery opening. Six binder delivery nozzles were employed with those nozzles which lie on the minor axis of the Unifan™ nozzle not being used. The north wall of the furnace was first sprayed at its corners; thereafter, a 2-3 inch (5 to 7.5 mm) base layer was applied which was thereafter built up to approximately 6 inches (15 cm) overall thickness, doing 3 by 4-foot sections at a time. The spray nozzle was maintained to 3-4 feet (1 to 1.3 m) distant from the surface being sprayed. The back wall was also sprayed, first in its corners and thereafter around the burner, and completed using the same procedure employed for the north wall to a thickness of about 6 inches (15 cm). Following deposition of the ceramic fiber and binder, this back wall surface was further sprayed with binder solution only. During this trial, the fiber feed rate was between 10 and 11 pounds per minute and binder solution/dispersion was delivered at a rate between 13 and 13-½ pounds per minute. Very little rebound was observed and was estimated to be less than 1 percent. Prespraying of the corners appeared to create a bracing force for the remainder of the lining to be sprayed adjacent the corners. Gradual buildup of the lining to its final thickness appeared to be more effective than more rapid buildup of smaller areas of the furnace. Spraying from a distance of 2 to 3 feet (0.6 to 1.0 m) resulted in a more uniform and flat lining of lower density than spraying from closer distances. Tamping of the wet newly applied lining resulted in a board-like surface.

Following installation of this lining, the furnace was fired to 1093° C. (2000° F.) for 24 hours and thereafter to 1177° C. (2150° F.) for 144 hours. After this cycle, the average linear shrinkage observed for the north wall was 1.2 percent based on initial measurements; the average linear shrinkage observed for the back wall was 0.8 percent based on initial measurements.

EXAMPLE 4

The south wall surface of the furnace of Example 3 was insulated with sprayed-on fiber in a similar manner and at the same time that Example 3 lining was installed (prior to any firing of the furnace) as follows:

A binder solution/dispersion was formed which contained on a dry weight basis 0.075 percent Reten ® 525 and 10 percent Nalco ® 1034-A. The south wall of the furnace was sprayed utilizing the same machine settings for fiber and binder delivery rates as in Example 3. The south wall was sprayed in the same manner as the north wall except for the change of binder system. The doorway of the furnace was sprayed to form a 6 inch (15 cm) thick ceramic fiber insulation layer in the same manner as the north and south walls; thereafter, an additional inch was applied, resulting in a total thickness of about 7 inches (18 cm). The surface of the already insulated door was wetted with binder solution only and then tamped slightly to compact it resulting in a board-like surface. As in Example 3, the amount of rebound observed was less than 1 percent. After cycling the furnace, as in Example 3, linear shrinkage of the south wall was determined to be an average of about 1.2 percent. No anchors were employed in the walls in either of Examples 3 and 4. The binder system of Example 4 resulted in slightly lower measured linear shrinkage than that of Example 3. Fewer surface cracks were observed than in Example 3 north wall. As in Example 3, good adhesion was observed; the lining remained in place until manually removed. Inspection of the metal substrate surface after removal of the sprayed material revealed evidence of slight corrosion in contrast to the north wall of Example 3 which did not show any evidence of corrosion attack by the binder system.

EXAMPLE 5

Organic binder coated ceramic fibers were prepared by adding powdered water-soluble polymers onto ceramic fibers as they were formed. A vertically-falling stream of molten ceramic material (alumino-silicate from kaolin clay) was blown into bulk ceramic fibers by impinging on it a high-velocity blast of air from a primary blowing air nozzle which was directed horizontally at right angles to the direction of fall of the molten ceramic stream. A twin-auger, K-Tron Corporation, model T-20 volumetric feeder, was positioned approximately 3 inches (7.5 cm) above and 1 inch (2.5 cm) in front of the primary blowing air nozzle. Due to heat in the locale, it was necessary to protect the volumetric feeder with ceramic fiber insulation due to its proximity to the melt stream. A polyalkylene oxide lubricant, Union Carbide Corporation 50 HB-100, was applied to the fiber as a 4 percent aqueous solution by introducing this solution into the blast of air to provide a calculated lubricant level of 0.5 percent based on dry weight of ceramic fiber.

Two powdered organic binder components were individually used to coat the fibers: Natrasol ® 250 HHR hydroxyethylcellulose from Hercules, Inc., and Reten ® 525 acrylamide polymer from Hercules, Inc. During ceramic fiber formation at 1300 lb/hr, one of these polymers was added at a time at 3.5 lb/hr, 6.5 lb/hr, and 25 lb/hr, which by calculation correspond respectively to coatings of 0.27 weight percent, 0.50 weight percent and 1.92 weight percent based on dry weight of the ceramic fiber. Subsequent spray-on lining applications utilizing these fibers indicated that the higher the organic binder component coating content the higher the adhesion and cohesion of the wet newly sprayed material.

EXAMPLE 6

The furnace of Example 3 was cleaned. Thereafter a new lining was sprayed using fibers which had been precoated with organic binder component. The fiber utilized was that from Example 5 having by calculation 0.50 weight percent of Reten ® 525 acrylamide polymer coating. The liquid binder in this case consisted only of Ludox ® HS-40 colloidal silica (Du Pont) diluted to 10 weight percent solids with Niagara Falls, N.Y., tap water. The use of the organic precoated fiber resulted in an easier handling of materials. Less rebound was observed during installation. Better wet adhesion and wet cohesion resulted than when Reten ® 525 is added to the binder liquid. Sprayed-on layers up to 12 inch (30 cm) thickness were possible using this precoated fiber. In the present example, a successful installation was achieved of a 6 inch (15 cm) thick lining on the back wall, north wall and ceiling, and a 9 inch (23 cm) thick lining on the south wall.

Following installation of this lining, the furnace was set at 427° C. (800° F.) for 8 hours and thereafter fired to 1093° C. (2000° F.) for 96 hours to 1260° C. (2300° F.) for 120 hours. After this total firing cycle, the overall appearance of the sprayed material was excellent. The average linear shrinkage was 1.6 percent.

EXAMPLE 7

An industrial furnace having an interior surface area of 860 square feet was insulated by spraying uncoated bulk lubricated fiber (SEM 6000L). The binder system consisted of 10 weight percent silica solids derived from Nalco ® 1034-A colloidal silica (Nalco Chemical Co.) with 0.075 weight percent of water soluble acrylamide polymer Reten ® 525 in tap water.

The flat ceiling (10 feet×30 feet) of the furnace was all steel with "Y" shaped anchors separated 6 inches (15 cm) between centers. The anchors were all bent parallel to the ceiling. The side walls were lined with new refractory brick. The back wall had 3 feet (1 m) of refractory lining on its bottom portion, the rest being a steel shell. The anchors were relatively close to each other to investigate their effect on the support of the sprayed material on a relatively large area. No anchors were utilized on the walls.

The liquid binder inorganic-organic system was pumped at a rate of 12-13 lb/min while the fiber was delivered at a rate of 10-11 lb/min through a Unisul ® A-300 apparatus. The ceiling was sprayed to 6 inches (15 cm) thickness in two passes while the walls were sprayed to 3 inches (7.5 cm) thickness in a single pass. It was found that the 6 inch (15 cm) separation between anchors is not desired because they almost form a continuous line. This made spraying more difficult because of the need to apply the wet fiber very carefully around the edges of the anchors to avoid the formation of voids. Better results are obtained when the anchors are separated approximately 12 inches (30 cm) between centers. After the successful installation of the lining, the furnace was set at 427° C. (800° F.) overnight. The following day the furnace was heated to its usual temperature of 982° C. (1800° F.).

After 6 months of continuous cyclical operation, part of the sprayed-on layer fell from the ceiling. The layer on the walls did not present any problems. Upon analysis of the fallen material, it was found that proximity of the anchors created a continuous shear line which contributed to failure of the layer. It was also observed that a large amount of rust had formed on the metal interface.

EXAMPLE 8

The flat steel ceiling of the furnace of Example 7 was relined by spraying the same uncoated bulk lubricated fiber used in Example 7 (SEM 6000L). The binder system consisted of a Ludox ® HS-40 colloidal silica (Du Pont), diluted 10 weight percent solids and 0.075 weight percent of water soluble acrylamide polymer Reten ® 525 in tap water. Prior to spraying, the metallic Y-shaped anchors were rearranged to have 12 inch (30 cm) distance between centers instead of 6 inches (15 cm). The arms of the Y-shaped anchors were also bent parallel at 2 inches (5 cm) from the ceiling instead of 1 inch (2.5 cm).

The liquid binder system was pumped at a rate of 12-13 lb/min while the fiber was delivered at a rate of 10-11 lb/min. The ceiling was sprayed to 6 inches (15 cm) thickness. The larger separation of the anchors centers facilitated installation around the edges of the anchors. Immediately after the installation was completed, the furnace was fired to 427° C. (800° F.) overnight. The following morning it was taken to 1093° C. (2000° F.). Inspection of the lining after six months of continuous thermal cycling to 982° C. (1800° F.) revealed the sprayed material to be in excellent condition with only minor surface cracks.

EXAMPLE 9

An industrial car bottom annealing furnace of about 360 sq. ft. surface area on a refractory lined arched ceiling of about 16 feet (5 m) length and 12-½ feet (4 m) width was to receive 3 inches (7.5 cm) of sprayed-on ceramic fiber insulation over its arched ceiling. The refractory lining forming the ceiling was old, relatively uneven, and had not been sand blasted. Its surface appeared to have a glassy-like film with noticeable carbon deposits apparent throughout its entire area. Due to the production demands on this furnace, it was not possible to delay installation by sand blasting the refractory. SEM 6000L Fiberfrax ® fiber was used. The binder was Nalco ® 1034-A diluted to 10 percent solids and 0.075 percent by weight of Reten ® 525 in water.

The installation proceeded without problems. Immediately after installation, the furnace was fired rapidly to 871° C. (1600° F.), although it was recognized that failure to allow the lining to dry at, for example, 427° C. (800° F.) might cause early failure. No anchors were employed. After approximately one month of continuous usage, during which the furnace was cycled to 1038° C. (1900° F.), about two thirds of the spray-applied layer of the ceiling fell.

EXAMPLE 10

The industrial furnace of Example 9 was reinsulated by spraying bulk lubricated fiber. The fiber utilized was SEM Fiberfrax ® 6000L. The liquid binder in this case consisted of Ludox ® HS-40 colloidal silica diluted with tap water to 10 weight percent solids and 0.075 weight percent solids Reten ® 525 acrylamide polymer. The furnace was an old refractory unit having an arched ceiling. Some areas of the ceiling were in bad condition due to spalling of the bricks. No anchors were used. The binder was pumped at a rate of 12-13 lb/min while the fiber was delivered at 10-11 lb/min. The whole interior of the furnace was successfully sprayed to 3 inches (7.5 cm) thick in a single attempt. After the installation of the lining, the furnace was set at 427° C. (800° F.) overnight. The following day the furnace was taken to 1038° C. (1900° F.) and cycled continuously to this temperature for approximately one month, after which part of the layer on the ceiling fell, indicating a need for mechanical supports on overhead installations on this refractory surface. Failure was believed to be due to high thermal expansion/contraction of the underlying refractory brick.

EXAMPLE 11

Different types of certamic fiber were evaluated to determine their relative suitability for use in the formation of thermally insulating coatings by spray application in combination with binders utilizing a Unisul ® 300 fiber sprayable machine. All of the fibers listed in Table I were prepared by Sohio Engineered Materials Company (SEM), Fibers Division, Niagara Falls, N.Y.

TABLE I

| Comments | Spun Bulk | Blown 1 | Blown 2 | Blown 2 Lubed |
|---|---|---|---|---|
| Sprayability | Poor | Okay | Good | Best |
| Avg. diameter (microns) | 3.5 | 2.5 | 2.5 | 2.5 |
| Length (cm) | up to 10 | up to 5 | up to 5 | up to 5 |
| Density (PCF) | 7 | 12-14 | 8-11 | 8-11 |
| Compatability with Unisul ® equipment. | No | Yes | Yes | Yes |
| Uniformity of sprayed-on product. | Poor | Okay | Good | Best |

Spun bulk fiber (prepared by pouring molten ceramic material onto cooled rapidly spinning wheel) does not work well with the Unisul ® 300 fiber sprayable machine unless the fiber is mechanically opened prior to feeding to the spray gun. The Unisul ® equipment does not provide such opening action. Blown 1 fiber (prepared by pouring molten ceramic material from a tilt furnace into a blast of air) processes satisfactorily through the Unisul ® spray equipment but product density and and amount of fiber used are excessive for many industrial furnace insulating linings. While Blown 2 bulk fiber (prepared under different blowing conditions) is satisfactory, Blown 2 bulk lubed fiber is preferred due to the presence of the lubricant which facilitates processing through the spray apparatus. The lubricant also helps to prevent agglomeration (balling up) of the fibers. Agglomeration is undesirable because it inhibits effective coating of the fiber with binder and results in a sprayed-on layer of non-uniform density.

EXAMPLE 12

The various binder candidates listed in Table II below were prepared by diluting with tap water the concentrated sol as obtained from its manufacturer, and adding the powdered organic component. The liquid binder was maintained at ambient room temperature of about 24° C. (75° F.) during and after preparation. A combination was rated compatible if binder candidate did not separate after mixing. Those binder candidates which did not separate upon standing were evaluated to determine their potential effectiveness. Evaluation was made using the laboratory screening procedure described hereinabove using an Instron ® testing machine set at 2 lb. full scale load, a 50 lb. load cell and a crosshead separation speed of 0.2 in/min. The particular blanket product employed was SEM Durablanket ™ alumino-silicate fiber, of 1 inch (2.5 cm) nominal thickness and four (4) lb/cu.ft. (pcf) density. Sample size was 6 inches (15 cm) by 3 inches (7.5 cm) by 1 inch (2.5 cm). The 6 inch (15 cm) by 1 inch (2.5 cm) area was wetted with the liquid binder sample and contacted perpendicularly with the anchored plate.

TABLE II

| Binder Candidate Sample No. | Description | Compatible? | Average Wet Adhesion (g/sq · cm) |
|---|---|---|---|
| 11-1 | 6.5% NALCO ® ISJ-614 + 0.35% RETEN ® 525 | No | — |
| 11-2 | 6.5% NALCO ® ISJ-614 + 0.35% RETEN ® 420 | Yes | 6.7 |
| 11-3 | 6.5% NALCO ® ISJ-614 + 0.35% RETEN ® 210 | Yes | 5.4 |
| 11-4 | 6.5% REMET ® COLLOIDAL ZrO₂ (ACETATE SOL) + 0.35% RETEN ® 525 | No | — |
| 11-5 | 6.5% REMET ® COLLOIDAL ZrO₂ (ACETATE SOL) + 0.35% RETEN ® 420 | Yes | 3.4 |
| 11-6 | 6.5% REMET ® COLLOIDAL ZrO₂ (ACETATE SOL) + 0.35% RETEN ® 210 | Yes | 6.1 |
| 11-7 | 6.5% LUDOX ® HS-40 + 0.35% RETEN ® 525 | Yes | 7.0 |
| 11-8 | 6.5% LUDOX ® HS-40 + 0.35% RETEN ® 420 | Yes | 5.2 |
| 11-9 | 6.5% LUDOX ® HS-40 + 0.35% RETEN ® 210 | Yes | 4.2 |

Each of binder candidates 11-2, 11-3, 11-5, 11-6, 11-7, 11-8 and 11-9 are deemed suitable for use in sprayed-on ceramic fiber lining according to the present invention. The higher the adhesion value, the better. It is to be noted that measured wet adhesion is a function not only of the type of organic binder component but also the inorganic binder component. For example, compare results for Examples 11-2 and 11-5.

Nalco ® ISJ-614 is cationic (positive charge on particles) colloidal alumina. Remet ® colloidal zirconic is cationic. Ludox ® HS-40 is anionic (negative charge on particles). Reten ® 525 is anionic polyacrylamide; Reten ® 420 is non-ionic polyacrylamide; and Reten ® 210 is cationic polyacrylamide.

EXAMPLE 13

Base-type and acid-type aqueous silica sols were evaluated in combination with various organic polymers as to their effectiveness in obtaining wet adhesion. Evaluation was made using the laboratory screening procedure described hereinabove and in Example 11. The binder candidates and the results obtained are listed in Table III below.

TABLE III

| Binder Candidate Sample No. | Description-Composition | Average Wet Adhesion (g/sq · cm) |
|---|---|---|
| 12-1 | 10% LUDOX ® HS-40 + 0.5% RETEN ® 523 | 2.4 |
| 12-2 | 10% LUDOX ® HS-40 + 0.5% NATRASOL ® 250 HHXR | 4.0 |
| 12-3 | 10% LUDOX ® HS-40 + 0.5% CARBOPOL ® 941 | 5.3 |
| 12-4 | 10% LUDOX ® HS-40 + 0.5% RETEN ® 525 | 7.6 |
| 12-5 | 10% LUDOX ® HS-40 + 0.5% METHOCEL ® A4M | 7.1 |
| 12-6 | 10% NALCO ® 1034A + 0.5% NATRASOL ® 250 HR | 4.6 |
| 12-7 | 10% NALCO ® 1034A + 0.5% RETEN ® 525 | 6.4 |
| 12-8 | 10% NALCO ® 1034A + 0.5% METHOCEL ® A4M | 8.2 |
| 12-9 | 10% NALCO ® 1034A + 0.5% RETEN ® 220 | 11.0 |

Each of Reten ® 523, 525 and 220 is an acrylamide polymer.

The concentrations in Table III are expressed in terms of weight percent solids. Tap water was used to dilute the concentrated sols. While each of sample numbers 12-1 through 12-9 exhibited acceptable wet adhesion values, samples 12-3, 12-6 and 12-9 were deemed too viscous and gelatinous to be effectively sprayed onto the ceramic fibers. These organic binder components should rather be precoated onto the ceramic fiber and used with a liquid binder having no or very low levels of organic binder component in solution.

EXAMPLE 14

An industrial carb bottom annealing furnace, having a brick refractory lining, was to be treated with sprayed-on ceramic fiber insulation. The sprayable ceramic fiber lining utilized SEM Fiberfrax ® 6000L, which had been treated at its time of manufacture to have a coating of, by calculation, 0.5 weight percent Reten ® 525 based on weight of fiber. The binder consisted of Ludox ® HS-40 colloidal silica diluted to obtain a concentration of 10 percent solids by weight based on total weight of binder solution/dispersion. This trial was conducted during January in the northern part of the United States. The brick surface of the furnace was less than 5° C. (40° F.). The surface was relatively clean, having been sandblasted. Expansion joint openings up to 1 inch thick were present in the ceiling of the furnace.

The first attempt to spray a ceramic fiber layer onto the ceiling of the furnace was unsuccessful. It was observed that the sprayed-on material had less wet adhesion than usual. The furnace was warmed by firing three of its seven burners for about 0.75 hour. Thereafter, no additional adhesion problems occurred. Spraying was interrupted periodically to rewarm the furnace until completion of the spray application. Based on the poor performance observed at cold brick temperature, it is recommended that the substrate furnace be at least 10° C. (50° F.) at the time of application.

EXAMPLE 15

A car bottom type furnace having a lining of dense insulating fire brick (IFB) and a surface area of about 180 sq. ft. was insulated with sprayed-on ceramic fiber insulation to a nominal thickness of 3 to 4 inches (7.5 to 10 cm). Precoated fiber having 0.5 percent by weight of fiber by calculation of Reten® 525 was used. Barbed studs 6 inches (15 cm) long with twist-to-lock washers placed on 18 inch (45 cm) centers were utilized in the flat refractory brick roof. The brick in this furnace was quite old and initially absorbed a large amount of binder solution/dispersion (10 weight percent solids from Ludox® HS 40), resulting in separation of the sprayed-on ceramic fiber insulation from its brick surface at first attempt. Heavy overspraying of this absorbent area of the brick prior to simultaneous spraying of binder and fiber alleviated the problem. A portion of the roof had been repaired with an insulating castable of unknown composition. This material was highly porous and continued to absorb moisture from the binder, resulting in separation of the sprayed-on ceramic fiber insulation even if presprayed with binder solution/dispersion. Following installation of the lining, the lining was dried and cured by firing the furnace to a temperature of about 427° C. (800° F.) for about 8 hours. Thereafter, the furnace was taken to its normal operating temperature of 982° C. (1800° F.). After 4 months service, the lining remains in good condition.

EXAMPLE 16

A steel bell furnace lid which operates at temperatures between 871° C. (1600° F.) and 1038° C. (1900° F.) was totally relined with ceramic fiber sprayed-on insulation to a thickness of 6 inches (15 cm) using SEM Fiberfrax® 6000L prelubricated fiber which had been precoated with organic binder component Reten® 525 to a calculated level of 0.5 weight percent based on dry weight of fiber. Unisul® spray apparatus was utilized. The spray apparatus was adjusted to deliver the precoated fiber at 12–13 lbs/min. and binder solution/dispersion at 12–13 lbs/min. The binder solution/dispersion was Ludox® HS-40 diluted with water to contain 10 weight percent silica solids. This bell shaped movable cover is moved during normal furnace operation, thus subjecting the lining to large mechanical abuse. Ceramic spike anchors and Y-shaped steel anchors placed on 36 inch (0.9 m) centers were employed. After installation, the cover was allowed to remain stationary for 3 days to develop high initial adhesion. The spray-applied layer appears in good condition after about 4 months continuous service.

EXAMPLE 17

The metal walls and ceiling of a steel shell industrial oven to be used in curing of precast shapes at temperatures up to 1093° C. (2000° F.) were insulated with sprayed-on ceramic fiber to 6 inches (15 cm) nominal thickness. Approximately 850 lbs. of SEM Fiberfrax® 6000L lubricated fiber, which had been precoated with 0.5 weight percent by calculation of Reten® 525 was used in combination with a binder solution/dispersion consisting of 10 percent colloidal silica obtained by water dilution of Ludox® HS-40. Prior to spraying, the ceiling of the furnace was prepared by placing on 12 inch (30 cm) centers wiggle-legged V-type anchors. Identical anchors were placed on 18 to 24 inch (46 to 61 cm) centers in the walls. No problems were encountered. After about 2 months in service, the spray-applied layer remains in good condition.

EXAMPLE 18

To demonstrate the added wet adhesion and wet cohesion due to the organic binder component, steel panels were suspended to present a downwardly facing horizontal overhead surface. Unisul® spray equipment was adjusted to deliver 11 lb/min of lubricated spun bulk alumino-silicate fiber and liquid binder solution/dispersion at 18 lb/min.

The first panel was sprayed using as a binder liquid Ludox® HS-40 diluted with tap water to 10 weight percent silica solids. No organic binder component was used. When the sprayed ceramic fiber layer reached a thickness of about 8.5 cm (3.5 inches) it fell from the panel.

The second panel was sprayed using as binder a solution/dispersion in tap water of Ludox® HS-40 diluted to 10 weight percent solids and Natrasol® 250 HHR at 0.25 weight percent solids. The second panel was sprayed to a thickness of 10–11.5 cm (4 to 4.5 inches) without failure.

Upon drying, the sprayed on fiber layer was firmly adhered to the panel.

We claim:

1. Ceramic fiber having a dry coating thereon of an organic polymer binder which when wetted by a solvent for said organic binder is sufficient to impart a wet adhesion to steel of at least 0.2 gm/cm$^2$.

2. The ceramic fiber of claim 1 having a coating thereon in amount of 0.05 to 5.0 weight percent of an organic polymer selected from the group consisting of acrylamide, hydroxyethylcelluloses, carboxymethylcelluloses and carboxyethylcelluloses, or mixtures thereof.

3. The fiber of claim 2 wherein the coating additionally includes an organic polymer lubricant.

4. The fiber of claim 3 wherein the lubricant is polyalkylene oxide present in amount of 0.25 to 1.0 percent by calculation based on weight of fiber.

5. The fiber of claim 1 wherein the coating is polyacrylamide present in amount of from about 0.5 to about 1 percent by calculation by weight based on weight of fiber, and the fiber additionally includes in its coating from about 0.5 to about 1.0 percent by calculation by weight of polyalkylene oxide lubricant.

* * * * *